(12) United States Patent
Kempf

(10) Patent No.: US 6,209,063 B1
(45) Date of Patent: *Mar. 27, 2001

(54) MANAGEMENT OF THE INFORMATION FLOW WITHIN A COMPUTER SYSTEM

(75) Inventor: Kimberly Kempf, Des Moines, IA (US)

(73) Assignee: Microware Systems Corporation, Des Moines, IA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,363

(22) Filed: May 7, 1998

(51) Int. Cl.[7] .................................................... G06F 12/00
(52) U.S. Cl. ........................ 711/135; 711/143; 711/141; 345/511; 345/507
(58) Field of Search ................................. 345/511, 507; 711/135, 143, 141

(56) References Cited

U.S. PATENT DOCUMENTS

| | | | |
|---|---|---|---|
| 4,486,856 | * | 12/1984 | Heckel et al. ........................ 364/900 |
| 5,208,908 | * | 5/1993 | Harrison et al. ..................... 395/150 |
| 5,347,634 | * | 9/1994 | Herrell et al. ....................... 395/250 |
| 5,726,947 | * | 3/1998 | Yamazaki et al. ............... 365/230.03 |
| 5,778,425 | * | 7/1998 | Shigeeda ............................. 711/122 |
| 5,825,371 | * | 10/1998 | Shirakawa ............................ 345/501 |
| 5,945,974 | * | 8/1999 | Sharma et al. ....................... 345/115 |

OTHER PUBLICATIONS

Computer Architecture A Quantitative Approach, John Hennessy, pp. 466–467; 533–537, Dec. 1990.*

* cited by examiner

Primary Examiner—Eddie P. Chan
Assistant Examiner—Kimberly McLean
(74) Attorney, Agent, or Firm—Daniel A. Rosenberg; Kent A. Herink; Davis, Brown Law Firm

(57) ABSTRACT

A computer system that utilizes a method that manages the flow of information between a memory storage area, a display screen, and a cache. The information flow within the computer system is managed by monitoring the initiation of the display screen blanking interval and then selecting a data entry in the cache which corresponds to display memory during the display screen blanking interval, and flushes the contents of that data entry to the memory area. The process repeats for each such data entry in the cache.

14 Claims, 5 Drawing Sheets

MANAGEMENT OF THE INFORMATION FLOW WITHIN A COMPUTER SYSTEM

BACKGROUND OF THE INVENTION

The invention relates to the control of information flow between a memory storage area, a cache, and a raster display screen, and in particular to coordinating the flow of information between the memory storage area, the cache, and the raster display screen, with the blanking interval of the raster display screen.

Computer systems utilize a microprocessor which controls the operation of the computer. The microprocessor typically contains a core processor which at its most basic level performs read, write, and binary arithmetic operations. The core operates at an astonishing rate, it is not uncommon for microprocessor cores to operate at rates of between 30 MHz and 200 MHz. This means it takes the core from 5–30 nanoseconds to perform a single operation.

Core processors execute a defined instruction set and operate on data. The instruction set and the data are stored in memory locations external to the core processor. Furthermore, the core processor is not the only component of the microprocessor that requires access to the external memory areas, and all of the traffic between the microprocessor and the external memory typically takes place over a single external bus (e-bus). For example, data transfer can take place between the external memory area dedicated for storage of display screen raster bitmap and the display screen controller over the e-bus. A typical display screen with a pixel area of 640 columns by 480 rows, where each pixel requires 8 bits of memory, requires over 2.4 million bits of dedicated storage. Additionally, a typical display screen requires refreshing at a rate of at least 45 Hz. This means roughly 110 million bits of information flow through the e-bus every second merely to keep the display screen refreshed. In some systems, updating the display screen comprises one third of all of the e-bus traffic. Competition for access to memory via the e-bus creates significant data traffic problems in all computer systems. Accordingly, the core processor must compete with the rest of the system for e-bus bandwidth when accessing external memory. This creates substantial slowdowns in the operation of the core in at least two ways. First, since the core processor is capable of operating at several times the speed of the external memory, therefore, any trip to external memory causes core processor delay. On top of this delay, the core processor must compete for e-bus bandwidth with the rest of the system. This means the core is often idle while waiting to communicate with external memory due to heavy system traffic on the e-bus.

As mentioned above, memory access time is significantly slower than core processing time. For example, the time required to read or write to a single memory location can take 50 nanoseconds for a memory operating at 20 MHz. Therefore, while the fastest cores might operate at 200 MHz, the fastest memories operate at one-tenth that speed.

Maximizing the operation of fast microprocessor cores requires minimizing the frequency of the time-consuming read/write trips over the e-bus to external memory. To solve this problem, microprocessors include on-chip caches, which can store either data or instructions needed by the core. In general, microprocessor designs utilize one of two cache types. The first type of microprocessors utilize one cache for storing data and another cache for storing instructions, the second type of microprocessors use one cache for storing both instructions and data. Regardless, by creating a dedicated direct connection between the cache and the core, the core can very quickly perform read/write operations on the cache. If the information needed by the core resides in the cache, expensive and time consuming trips to memory are thereby eliminated. Thus, on-chip caches and operating system techniques to keep the caches updated with the information the core is most likely to use, comprise a main method to speed up overall computer system performance.

Use of on-chip caches, however, creates another systemic problem in computer systems. Core processing of data transferred from external memory to the cache will change the information residing in the cache. Thus, the original external memory locations require updating to reflect the operational changes taking place in the cache. Illustrating with the screen display example, the contents of external memory locations that correspond to display screen data locations require transfer into the cache for processing by the core. This occurs whenever the display on the display screen requires manipulation, which is nearly constantly in most computer systems. For a display screen that refreshes 45 times per second, the system must transfer information from external memory to the display screen controller at a similar rate or faster. However, updated screen display information may still reside in the cache. If the information does transfer from the cache to the external memory in time to transfer to the display screen, the display screen will display incorrect or incomplete information.

One prior art solution for this problem, common to larger PC-level processors, comprises designing into the microprocessor hardware a bus snooper. Bus snoopers require a specialized hardware connection between the cache and the screen display controller, and enable direct transfer of screen display data from the cache to the screen display controller by forcing the controller to use the recent data in the cache rather than the stale data in memory. This solution, however, proves impracticable for all but the largest and most powerful microprocessors. The premium on microprocessor die size eliminates the possibility of such dedicated hardware for most microprocessors, especially those microprocessors associated with highly compact and portable computer driven devices. While at the same time, the computing demands placed on these compact and portable computer devices continues to accelerate. Thus, these devices are called on to perform graphically like larger PC's, but due to size and power consumption concerns, they do not contain the facilities required by the powerful PC microprocessors to implement the PC microprocessor's solution.

Microprocessors without snoopers, or other similar dedicated hardware, utilize a different approach to solve this problem. Most caches can operate in one of two modes: (1) copy-back, where the cache is constantly accessed by the core and external memory is updated later upon the occurrence of certain events; and (2) write-through, where reads from memory are placed in the cache and writes to the cache are written synchronously to external memory. In situations where the computer system must force data from the cache to external memory, the solution comprises operating in write-through mode. However, this essentially cripples the operating speed of the core. In write-through mode the core is reduced to operating at the speed of the slowest memory component, e-bus traffic is maximized, plus the core must compete with all the other systems over the e-bus for access to external memory. Accordingly, the present invention substantially eliminates the difficulties encountered hereto in the prior art as discussed herein-above.

SUMMARY OF THE INVENTION

An object of the present invention comprises providing a computer system which can transfer screen display data between a microprocessor cache and an external memory.

Another object of the present invention comprises providing a computer system which can timely transfer data between a cache and an external memory area dedicated to storage of screen display data to ensure high quality screen displays.

These and other objects will become present upon reference to the following, specification, drawings, and claims.

The present invention intends to overcome the difficulties encountered heretofore. To that end, the present invention comprises a computer system that manages the flow of information between a memory storage area, a display screen, and a cache. The computer system monitors a system signal that indicates the initiation of a blanking interval of the display screen and coincident with this blanking interval flushes the display screen data in the cache to the memory storage area, thereby allowing the computer system to display accurate information on the display screen.

DETAILED DESCRIPTION OF THE INVENTION

Figure 1:
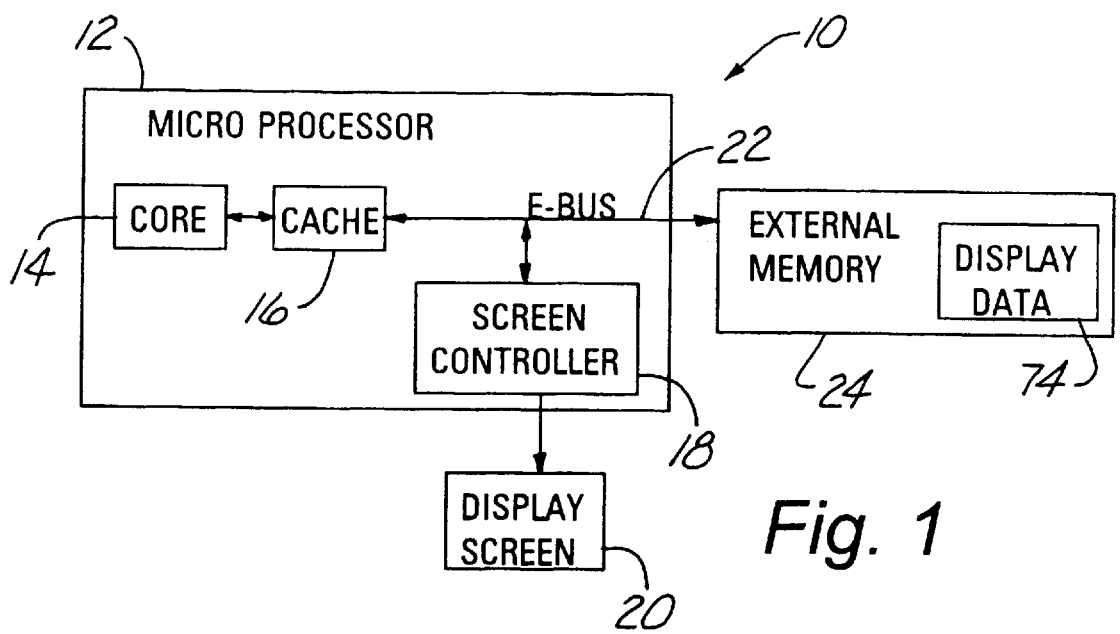
FIG. 1 is a block diagram of a computer system.

Referring to the drawings, FIG. 1 shows a computer system 10 comprised of a microprocessor 12. The microprocessor 12 comprises a core processor 14, the core processor 14 is connected for two way data communication with a cache 16. The microprocessor 12 also includes an e-bus 22 that provides two way data communication to a screen controller 18. The computer system 10 also includes an external memory 24 connected for two way data communication with the e-bus 22, and the computer system 10 contains a display screen 20 which receives data communication from the screen controller 18.

Figure 5:
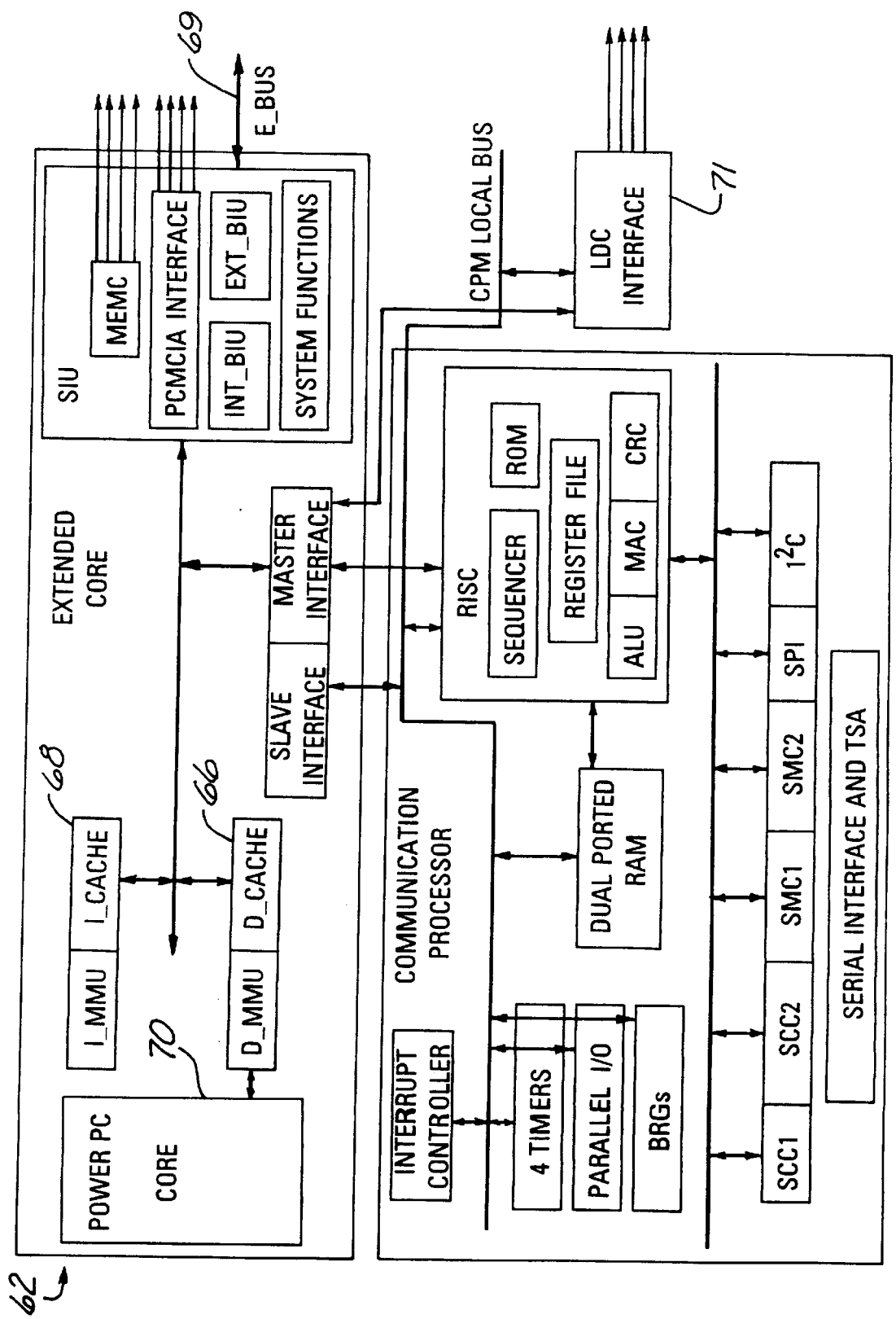
FIG. 5 is a block diagram of the Motorola MPC821 microprocessor.
Figure 6:
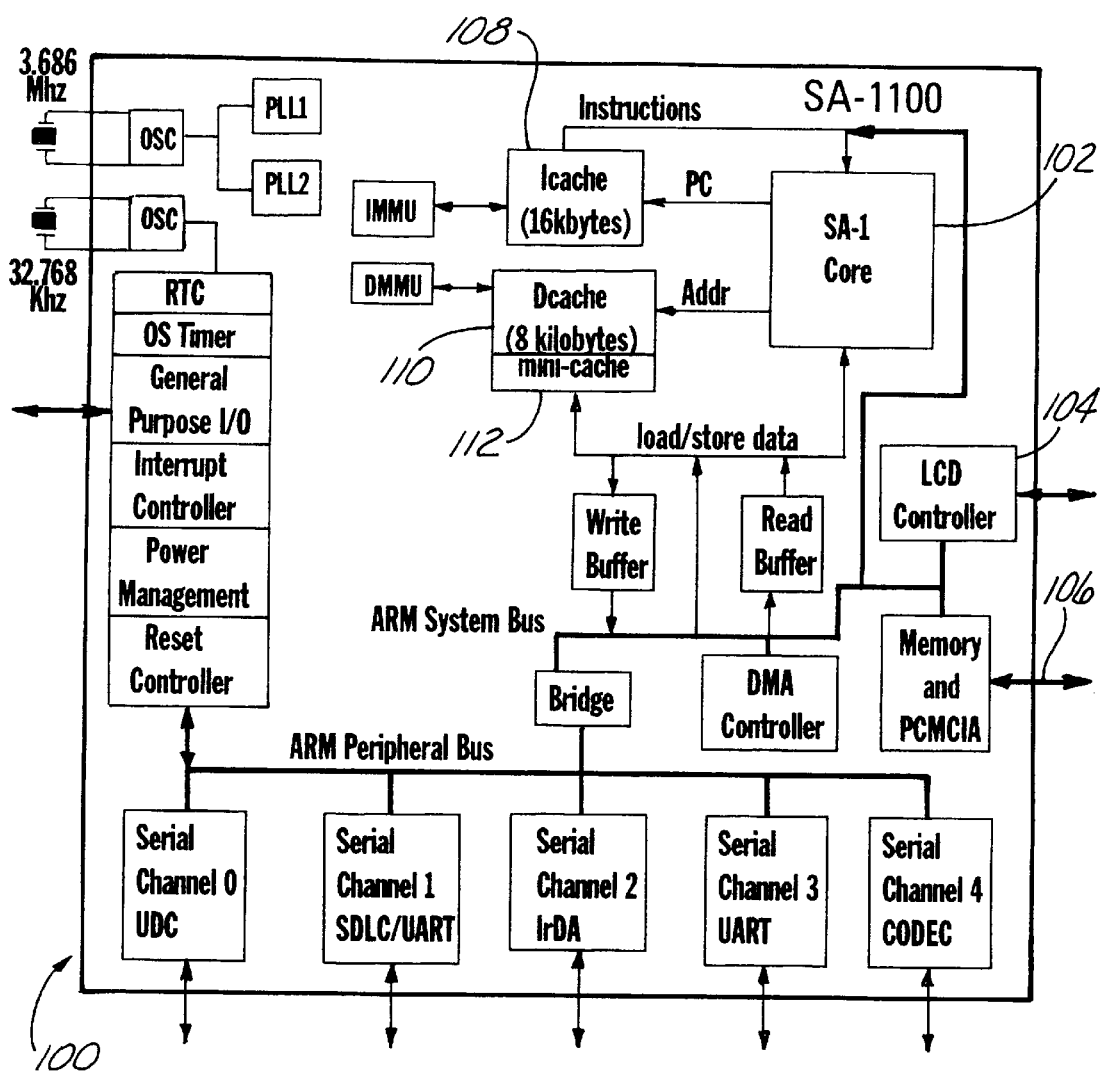
FIG. 6 is a block diagram of a Digital Semiconductor SA-1100 (StrongARM®) microprocessor.

FIG. 5 shows a block diagram of a Motorola MPC821 microprocessor 62, and FIG. 6 shows a block diagram of a Digital Semiconductor SA-1100 microprocessor 100. The MPC821 microprocessor 62 comprises a core processor 70 in communication with both a data cache 66, and an instruction cache 68. Furthermore, the MPC821 microprocessor 62 includes an e-bus 69 for communication between external memory (not shown) and the components of the MPC821 microprocessor 62. The MPC821 microprocessor 62 also contains a LCD Interface 71, or screen controller, for communication with a display screen (not shown). The SA-1100 microprocessor 100 comprises a core processor 70 in communication with an instruction cache 108, a data cache 110, and a special purpose mini-cache 112. Furthermore, the SA-1100 includes an e-bus 106 for communication between external memory (not shown) and the components of the SA-1100 microprocessor 100. The SA-1100 microprocessor 100 also contains a LCD Controller 104, or screen controller, for communication with a display screen (not shown). While the preferred embodiments of the present invention are designed for operation with the MPC821 microprocessor 62 and the SA-1100 microprocessor 100, the present invention is applicable to any computer system with the features depicted in FIG. 1.

Configured in the manner shown in FIG. 1, the computer system 10 can communicate information between the core processor 14 and the external memory 24 along the e-bus 22. Additionally, information can transfer from the external memory 24 to the display screen 20 along the e-bus 22, through the screen controller 18. The computer system 10 operates under the control of the core processor 14. The core processor 14 receives information from the cache 16, and then processes that information, and returns the information to the cache 16. In this manner, the core processor 14 can perform read and write steps on the cache 16 at a high rate of speed. However, if the information needed by the core processor 14 is not in the cache 16 the information must be retrieved from the external memory 24 over the e-bus 22. FIGS. 5–6 show that the core processors 70, 102 must compete for e-bus 69, 106 bandwidth with all of the other components of the microprocessors 62, 100. Thus, referring again to FIG. 1, each time the core processor 14 needs to communicate with the external memory 24 a tremendous loss in processing time occurs. In order to reduce the frequency at which the core processor 14 must exchange information with the external memory 24, the computer system 10 is provided with the cache 16 (FIG. 1). FIGS. 5–6 show both instruction caches 68, 108 and data caches 66, 110, however, the present invention can be practiced on computer systems which rely on a single cache 16. The operating system can greatly enhance the operating efficiency of the core processor 14 by ensuring that the data needed by the core processor 14 resides in the cache 16 at the time the core processor 14 requires the information. This is accomplished by always using the copy-back mode of data cache operation.

The external memory 24 contains an area for the storage of display screen data 74. In other words, a segment of the memory addresses contained within the external memory 24 are dedicated for the storage of the data to be displayed on the display screen 20. The data stored in the display screen data storage area 74, like all the other data in the external memory 24, travels along the e-bus 22. Thus, the data stored in the display screen data storage area 74 travels to the display screen 20 via the e-bus 22, through the screen controller 18. Since any changes to the display screen 20 require the core processor 14 to process the display screen data storage area 74, the operating system often transfers the data stored in the display screen data storage area 74 to the cache 16 for processing by the core processor 14. Coincident with this processing, the operating system transfers the data stored in the display screen data storage area 74 to the display screen 20 for display. A typical display screen 20 that is refreshed at 45 Hz. requires the operating system to cause the transfer of the data stored in the display screen data storage area 74 to the display screen 20 about 45 times a second. In order to ensure complete and accurate display, however, the operating system must ensure that any of the data stored in the display screen data storage area 74, transferred to the cache 16 for processing by the processor core 14, is transferred back to the display screen data storage area 74 prior to refreshing the display screen 20. To avoid crippling the processing time of the core processor 14, the operating system must accomplish this task while still taking advantage of the ability of the cache 16 to reduce the core processor's 14 trips to external memory 24. The following describes the method of achieving this result, wherein the method is performed by a computer-controlled program means such as an operating system.

Figure 2:
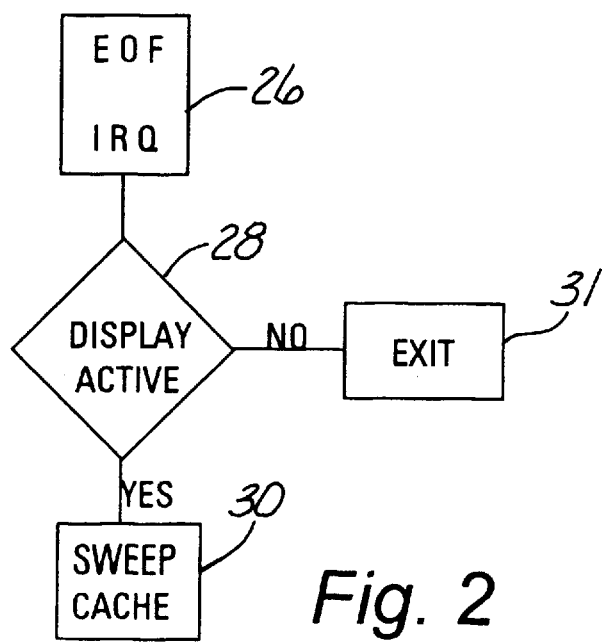
FIG. 2 is a flow chart of a computer-controlled method for managing the information flow within the computer system of FIG. 1.

The first step in the process comprises the display screen blanking interrupt step 26, that monitors a computer signal which communicates the beginning of the display screen blanking interval (FIG. 2). Commonly computer systems employ some type of interrupt request (IRQ) to communicate the beginning of the screen blanking interval, however, any suitable signal that communicates the beginning of the blanking interval of the display screen 20 will suffice. The length of the blanking interval will depend on the type of display screen 20 used in the particular computer system 10. Thus, the display screen 20 goes through a cycle of refreshing and blanking, which depends on the phosphorous (or liquid crystal) quality of the particular display screen 20 and the resolution and intensity of the graphic display. A typical display screen 20 will complete at least 45 blanking intervals per second. The next step in the process comprises the display active step 28, which determines whether the display screen 20 is currently active. In some instances, computer processing may take place that does not necessitate the use of the display screen 20. In such instances, the computer-controlled method is exited via the exit step 31, if the display screen 20 is active the computer-controlled method proceeds to the sweep cache step 30.

Figure 4:
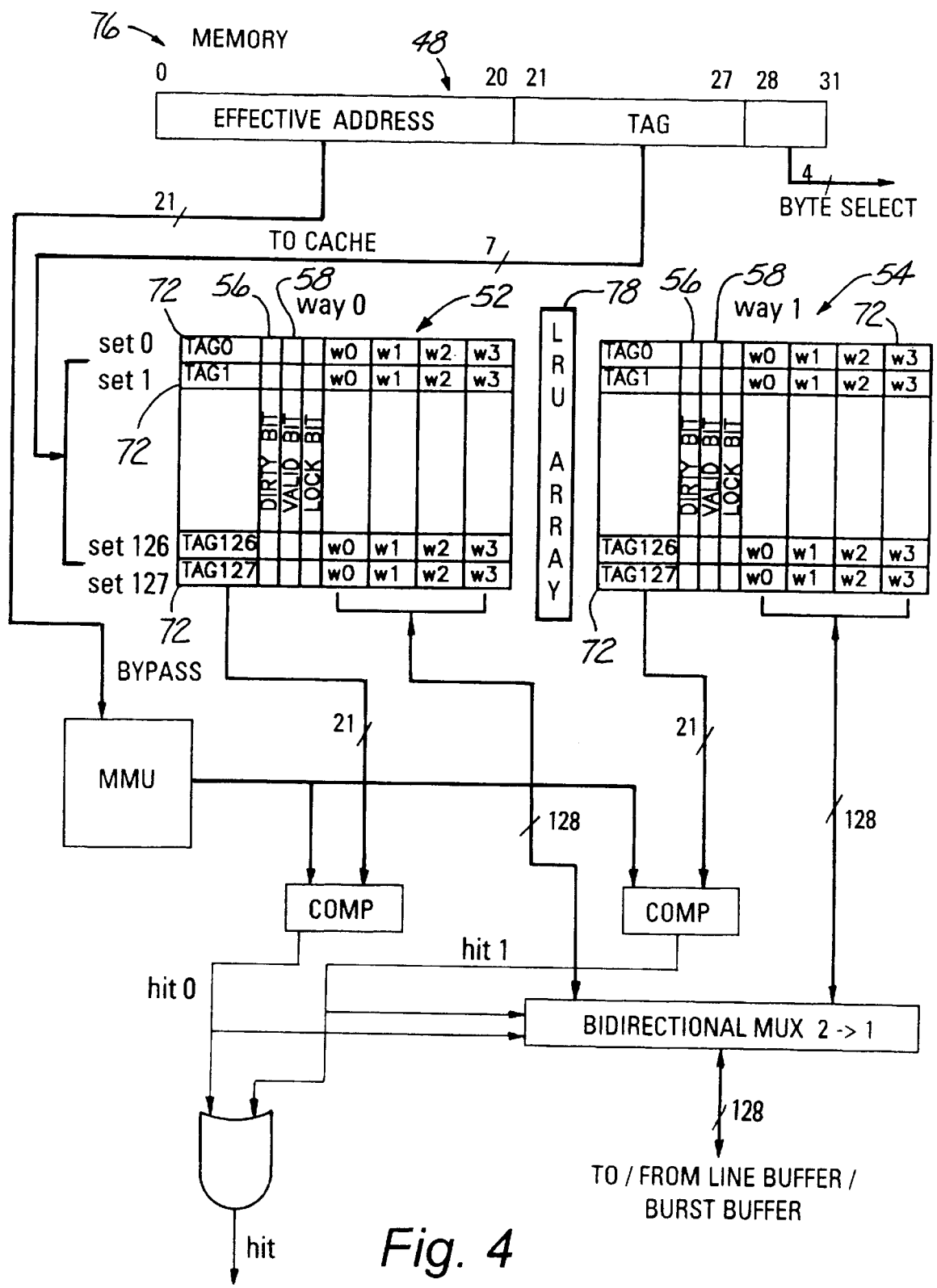
FIG. 4 is a block diagram of a data cache organization for a Motorola MPC821 microprocessor.

In one form the sweep cache step 30 involves selecting a data entry in the cache 16, and flushing the contents of that data entry to the external memory 24. The sweep cache step 20 repeats for each data entry in the cache 16. In other words, the operating system moves through the cache 16 line by line selecting each data entry and then transferring the data in that data entry from the cache 16 to the external memory 24 along the e-bus 22. FIG. 4 shows an example of a data cache 76 of the Motorola MPC82 microprocessor 62. The data cache 76 comprises a 4 K byte, two-way set associative physically addressing cache. The data cache 76 accepts a 32 bit memory addresses 48 from the external memory 24. The data cache 76 is comprised of two "ways", way0 52 and way1 54, and each way stores 128 data entries 72. An LRU array 78 is used to select between way0 52 and way1 54. A dirty bit 56 registers whether the data entry 72 in the cache has been changed. In other words, if the dirty bit 56 is set, this means that the core processor 70 has altered that particular data entry 72. The data stored in that data entry 72 in data cache 76 no longer corresponds to the original data taken from the external memory 24. A valid bit 58 registers whether a particular data entry 72 in the data cache 76 contains any data.

Figure 3:
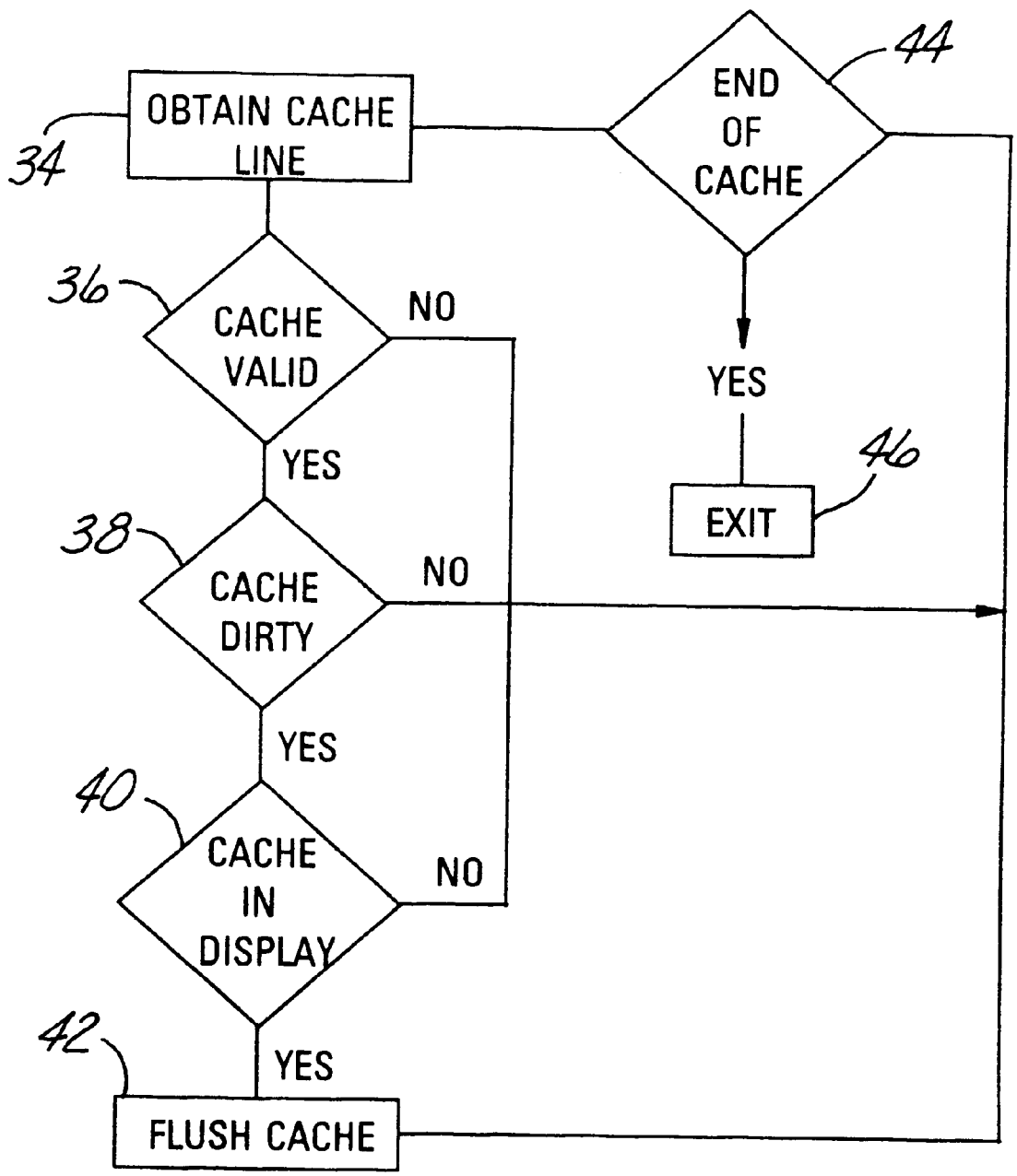
FIG. 3. is a flow chart of the sweep cache step of the computer-controlled method of FIG. 2.

In a first embodiment of the invention as applied to the MPC821 processor, the sweep cache step 30 further comprises the steps shown in FIG. 3. The first step comprises the obtain cache line step 34. Thus, the computer-controlled sweep cache step 30 first comprises selecting the first data entry 72 in the cache 76. Referring to FIG. 4, the first data entry 72 in the data cache 76 comprises the first line of way0 52. After performing the obtain cache line step 34, the next step comprises a cache valid step 36. In this step the valid bit 58 is examined to determine if the particular data entry 72 contains any data. If the valid bit 58 is not set, program control returns to the end of cache step 44. If the valid bit 58 is set, the cache dirty step 38 is performed. In the cache dirty step 38, the dirty bit 56 is examined to determine if the core processor 76 has performed an operation on the data entry 72, thereby altering the data entry 72. If the dirty bit 56 is not set, program control transfers to the end of cache step 44. If the dirty bit 56 is set, then program control transfers to the cache in display range step 40. In the cache in display range step 40 the memory address 48 of the particular data entry 72 is examined to determine if the memory address 48 corresponds to data stored in the area within the external memory 24 dedicated to the storage of display screen data 74. In this manner, only the data entries 72 of the cache 76 which originally came from the display screen data area 74 are selected. If the data entry 76 does not correspond to a memory address 48 within the external memory 24 dedicated to the storage of display screen data 74, program control passes to the end of cache step 44. Otherwise, program control passes to the flush cache step 42. Flushing the cache involves transferring the data entry in the cache 76 to the external memory 24. This updates the external memory 24 with the most recent value of the data entry 72. Thus, after the core processor 70 process the data entry 72 in the cache 76, the flush cache step 42 sends the updated data entry 72 to the external memory 24. Next program control transfers to the end of cache step 44, and the entire process repeats for the remaining data entries 72 in the cache 76. After processing the last data entry 72 in the cache 76 program control passes to the exit step 46.

In a second embodiment of the present invention, designed for implementation with the SA-1100 microprocessor 100, the sweep cache step 30 involves a complete flush of the mini-cache 112. The SA-1100 microprocessor 100 provides a separate special purpose mini-cache 112, for the storage of special purpose data that could benefit from complete processing by the core 102. Since the mini-cache 112 only stores 512 bytes of data, the entire cache can be flushed in the time it takes to select and flush the individual entries of the mini-cache 112. Thus, the SA-1100 microprocessor 100 does not provide the ability to individually select data entries within the mini-cache 112, and instead simply provides for the ability to flush the contents of the entire mini-cache 112 to memory. In the context of the present invention this provides the opportunity to load data from the display screen data storage area 74 of the external memory 24, into the mini-cache 112. Since this data typically requires frequent and complete processing by the core 102, completely flushing the entire mini-cache 112 in coordination with the blanking interval of the display screen, provides an efficient means to accomplish the purpose of the present invention. Of course, the availability of the mini-cache 112 does not prevent practicing the present invention on the data cache 110.

The present invention allows for timely updating of the display screen of a computer system while eliminating the dramatic reduction in core processing speed associated with prior art solutions. By timing the updating of the display screen data with the display screen blanking interval, the computer system keeps the traffic on the e-bus, and the trips to the core processor, to a bare minimum without impacting the quality of the visual display on the display screen. Thus, only the data that requires attention receives attention, and only when that attention is required.

The foregoing description and drawings comprise illustrative embodiments of the present invention. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention. For example, it is anticipated that the present invention can function with computer systems that utilize external memories or computer systems that utilize a microprocessor with on-chip memory.

I claim:

1. A computer-controlled method for the management of the information flow between a memory storage area, a display screen, and a cache such that the information flows in coordination with the screen blanking interval of the display screen thereby ensuring high quality display with minimal interruption to external bus traffic and core processor operation, said method comprising:

a) providing a computer system comprising:
  i) a microprocessor controller having a core processor;
  ii) a general purpose cache having a plurality of data entries, said cache in direct operable communication with said core processor of said microprocessor controller;
  iii) an external bus for handling operable communications to and from said microprocessor, said external bus in operable communication with said general purpose cache;
  iv) a screen controller in operable communication with said external bus, for processing of display screen data;
  v) a display screen for displaying information to a computer user, said display screen in operable communication with said screen controller;
  vi) a general purpose memory storage area in operable communication with said external bus, having an area for storage of said display screen data; and
  vii) a computer system signal for communicating information about a blanking interval of said display screen;

b) entering data into said general purpose cache from said general purpose memory over said external bus, wherein said data includes display screen data;

c) transferring data between said core processor and said general purpose cache such that at least one of said plurality of data entries in said general purpose cache changes;

d) monitoring said computer signal to detect said blanking interval of said display screen;

e) flushing said data entries of said general purpose cache to said general purpose memory area during said blanking interval; and f) transferring, for display on said display screen, said flushed screen display data from said general purpose memory to said screen controller over said external bus.

2. The invention in accordance with claim 1 wherein the flushing data entries step further comprises:

a) selecting one of said data entries of said cache;
b) flushing said selected data entry to said memory area during said blanking interval; and
c) repeating steps a) and b) for each of said data entries in said cache.

3. The invention in accordance with claim 2 wherein said step of selecting said data entry further comprises selecting only valid data entries in said cache.

4. The invention in accordance with claim 2 wherein said step of selecting said data entry further comprises selecting only dirty data entries in said cache.

5. The invention in accordance with claim 2 wherein said step of selecting said data entry further comprises selecting only said data entries in said cache that correspond to said area for storage of said display screen data.

6. The invention in accordance with claim 1 wherein said computer system signal for communicating said information about said screen blanking interval comprises an interrupt.

7. A computer-controlled method for the management of the information flow between a memory storage area, a display screen, and a cache such that the information flows in coordination with the screen blanking interval of the display screen thereby ensuring high quality display with minimal interruption to external bus traffic and core processor operation, said method comprising:

a) providing a computer system comprising:
  i) a microprocessor controller having a core processor;
  ii) a general purpose cache having a plurality of data entries, said cache in direct operable communication with said core processor of said microprocessor controller;
  iii) an external bus for handling operable communications to and from said microprocessor, said external bus in operable communication with said general purpose cache;
  iv) a screen controller in operable communication with said external bus, for processing of display screen data;
  v) a display screen for displaying information to a computer user, said display screen in operable communication with said screen controller;
  vi) a general purpose memory storage area in operable communication with said external bus, having an area for storage of display screen data; and
  vii) a computer system interrupt for communicating information about a blanking interval of said displace screen;

b) entering data into said general purpose cache from said general purpose memory over said external bus, wherein said data includes display screen data;

c) transferring data between said core processor and said general purpose cache such that at least one of said plurality of data entries in said general purpose cache changes;

d) monitoring said interrupt to detect said blanking interval of said display screen;

e) selecting one of said data entries in said general purpose cache during said blanking interval wherein said data entry is valid, and dirty, and corresponds to said area for storage of said display screen data;

f) flushing said data entries of said general purpose cache to said general purpose memory area during said blanking interval;

g) repeating steps e) and f) for each of said data entries in said general purpose cache; and h) transferring, for display on said display screen, said flushed screen display data from said general purpose memory to said screen controller over said external bus.

8. A computer system for the management of the information flow between a memory storage area, a display screen, and a cache such that the information flows in coordination with the screen blanking interval of the display screen thereby ensuring high quality display with minimal interruption to external bus traffic and core processor operation, said computer system comprising:

a) a microprocessor controller having a core processor;
b) a general purpose cache having a plurality of data entries, said cache in direct operable communication with said core processor of said microprocessor controller;

c) an external bus for handling operable communications to and from said microprocessor, said external bus in operable communication with said general purpose cache;

d) a screen controller in operable communication with said external bus, for processing of display screen data;

e) a display screen for displaying information to a computer user, said display screen in operable communication with said screen controller;

f) a general purpose memory storage area in operable communication with said external bus, having an area for storage of display screen data;

g) a computer system interrupt for communicating information about said display screen blanking interval;

i) a computer program means for entering data into said general purpose cache from said general purpose memory over said external bus, wherein said data includes display screen data;

h) a computer program means for transferring data between said core processor and said general purpose cache such that at least one of said plurality of data entries in said general purpose cache changes;

i) a computer program means for monitoring said interrupt to detect said blanking interval of said display screen;

j) a computer program means for selecting one of said data entries in said cache during said blanking interval wherein said data entry is valid, and dirty, and correspond to said area for storage of display screen data;

k) a computer program means for flushing said data entries of said general purpose cache to said general purpose memory area during said blanking interval; and j) repeating steps j) and k) for each of said entries in said general purpose cache; and l) a computer program means for transferring, for display on said display screen, said flushed screen display data from said general purpose memory to said screen controller over said external bus.

9. A computer readable memory for controlling the management of the information flow between a memory storage area, a display screen, and a cache of a computer such that the information flows in coordination with the screen blanking interval of the display screen thereby ensuring high quality display with minimal interruption to external bus traffic and core processor operation, said memory comprising:

a) a computer-controlled program means for controlling a microprocessor controller having a core processor;

b) a computer-controlled program means for controlling a general purpose cache having a plurality of data entries, said cache in direct operable communication with said core processor of said microprocessor controller;

c) an external bus for handling operable communications to and from said microprocessor, said external bus in operable communication with said general purpose cache;

d) a screen controller in operable communication with said external bus, for processing of display screen data;

e) a computer-controlled program means for controlling a display screen for displaying information to a computer user, said display screen in operable communication with said screen controller;

f) a computer-controlled program means for controlling a general purpose memory storage area in operable communication with said external bus, having an area for storage of display screen data;

g) entering data into said general purpose cache from said general purpose memory over said external bus, wherein said data includes display screen data;

h) a computer-controlled program means for transferring data between said core processor and said general purpose cache such that at least one of said plurality of data entries in said general purpose cache changes;

i) a computer-controlled program means for controlling a computer system interrupt for communicating information about said display screen blanking interval;

j) a computer-controlled program means for monitoring said interrupt to detect said blanking interval of said display screen;

k) a computer-controlled program means for selecting one of said data entries in said general purpose cache during said blanking interval wherein said data entry is valid, and dirty, and corresponds to said area for storage of display screen data;

l) a computer program means for flushing said data entries of said general purpose cache to said general purpose memory area during said blanking interval;

k) repeating steps k) and l) for each of said data entries in said general purpose cache; and m) a computer program means for transferring, for display on said display screen, said flushed screen display data from said general purpose memory to said screen controller over said external bus.

10. The invention in accordance with claim 9 wherein said computer readable memory comprises a hard disk.

11. The invention in accordance with claim 9 wherein said computer readable memory comprises a floppy disk.

12. The invention in accordance with claim 9 wherein said computer readable memory comprises a CD-ROM.

13. The invention in accordance with claim 9 wherein said computer readable memory comprises a random access memory.

14. The invention in accordance with claim 1 wherein all of said screen display data is flushed to said general purpose memory area in each of said blanking intervals.

* * * * *